United States Patent
Kohlhuber

(10) Patent No.: US 11,584,373 B2
(45) Date of Patent: Feb. 21, 2023

(54) METHOD, DEVICE AND MEANS OF TRANSPORT FOR AN AUTOMATED STARTING UP OF A MEANS OF TRANSPORT AT A LIGHT SIGNAL SYSTEM

(71) Applicant: Bayerische Motoren Werke Aktiengesellschaft, Munich (DE)

(72) Inventor: Florian Kohlhuber, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 190 days.

(21) Appl. No.: 17/048,191

(22) PCT Filed: Apr. 8, 2019

(86) PCT No.: PCT/DE2019/100319
§ 371 (c)(1),
(2) Date: Oct. 16, 2020

(87) PCT Pub. No.: WO2019/201382
PCT Pub. Date: Oct. 24, 2019

(65) Prior Publication Data
US 2021/0171036 A1     Jun. 10, 2021

(30) Foreign Application Priority Data

Apr. 16, 2018  (DE) .......................... 102018205753.2

(51) Int. Cl.
*B60W 30/18*     (2012.01)
*B60W 50/16*     (2020.01)
(Continued)

(52) U.S. Cl.
CPC ...... *B60W 30/18027* (2013.01); *B60W 50/16* (2013.01); *G06V 20/584* (2022.01);
(Continued)

(58) Field of Classification Search
None
See application file for complete search history.

(56) References Cited

U.S. PATENT DOCUMENTS 9,922,559 B1 *   3/2018   Inoue ............... G08G 1/096716
10,144,408 B2 *  12/2018  Theodosis .............. G08G 1/096
2015/0232026 A1 *  8/2015  Lueke .................. G06V 20/588
                                                            701/1

FOREIGN PATENT DOCUMENTS

DE   102011116304 A1   4/2012
DE   102011121442 A1   6/2013
(Continued)

*Primary Examiner* — Todd Melton
(74) *Attorney, Agent, or Firm* — 2SPL Patent Attorneys PartG mbB; Kieran O'Leary

(57) ABSTRACT

The invention relates to a method for an automated starting of a means of transport (80) at a light-signal system (70), comprising: recording an image of the light-signal system (70) by means of a first optical sensor (30) of the means of transport (80), determining a signaling state of the light-signal system (70) by means of the recorded image, executing an automated starting process of the means of transport (80) in response to a signaling state representing and/or announcing a travel clearance, determining a user action of a driver of the means of transport (80) for plausibility checking of the starting process, and depending on a result of the plausibility check, automatically continuing or terminating of the starting process.

18 Claims, 2 Drawing Sheets

(51) Int. Cl.
  *G08G 1/0962* (2006.01)
  *G08G 1/0967* (2006.01)
  *G06V 20/58* (2022.01)
  *B60W 50/14* (2020.01)

(52) U.S. Cl.
  CPC ... *G08G 1/09623* (2013.01); *G08G 1/096725* (2013.01); *B60W 2050/143* (2013.01); *B60W 2050/146* (2013.01); *B60W 2420/42* (2013.01); *B60W 2540/10* (2013.01); *B60W 2540/12* (2013.01); *B60W 2540/21* (2020.02); *B60W 2555/60* (2020.02); *B60W 2720/106* (2013.01)

(56)   References Cited

FOREIGN PATENT DOCUMENTS

| DE | 102014201132 A1 | 7/2015 |
| DE | 102015204122 A1 | 11/2015 |
| DE | 102015005222 A1 | 12/2015 |
| DE | 102017002237 A1 | 11/2017 |

\* cited by examiner

METHOD, DEVICE AND MEANS OF TRANSPORT FOR AN AUTOMATED STARTING UP OF A MEANS OF TRANSPORT AT A LIGHT SIGNAL SYSTEM

CROSS-REFERENCE TO RELATED APPLICATIONS

This application is a 35 U.S.C. § 371(c) national stage entry of PCT/DE2019/100319, filed on Apr. 8, 2019. That application claimed priority to German Application 10 2018 205 753.2, filed on Apr. 16, 2018. The contents of the earlier filed applications are incorporated by reference herein in their entirety.

FIELD

The invention relates to a method, a device and a means of transport for an automated starting of a means of transport at a light-signal system.

BACKGROUND

From the prior art, driver assistance systems are known which perform an automatic longitudinal control of a means of transport in relation to other road users and/or objects. Such driver assistance systems, referred to below as adaptive cruise control, are usually used for automated distance control with respect to means of transport travelling ahead or in connection with an emergency braking functionality to avoid collisions from the point of view of the means of transport. For this purpose, means of transport travelling ahead are detected, for example by means of radar and/or LIDAR sensors, and their position and movement behavior in relation to the means of transport are determined. In response to this, automated or semi-automated interventions into the longitudinal control of the means of transport may be carried out for acceleration or braking.

Furthermore, the German patent disclosure DE 10 2011 116304 A1, for example, proposes a driver assistance system that is capable of evaluating light signals from a light-signal system in order to inform a driver of a means of transport on a current state of the light-signal system. As a result, this driver assistance system may be used, for example, to remind the driver to start driving if the driver's attention is not focused on the light-signal system when stopping at them. For this purpose, in the prior art, in a display of the means of transport, among other things, symbols of a current signaling state of the light-signal system are represented. In addition, also further optical and/or acoustic and/or haptic indications may be used to draw the driver's attention to the traffic situation. However, modern control and display concepts for means of transport generally aim to avoid confronting the driver too frequently with corresponding indications, so as not to impair driving comfort and to ensure that the driver's full attention is paid to safety-relevant indications (e.g. for necessary manual brake intervention). Moreover, such a driver assistance system serves only to inform the driver and does not itself execute a control of the movement of the means of transport, such as longitudinal control. A starting process in response to an indication of a travel clearance by the light-signal system must therefore be carried out manually by the driver. Furthermore, the output of optical and/or acoustic and/or haptic indications of a signaling state of the light-signal system does not necessarily represent an intuitive connection for the driver with regard to a starting process.

In addition, methods and devices are known which allow fully automated driving of a means of transport, wherein ideally no intervention in the control of the means of transport by the driver is required. Accordingly, such methods and devices must be extremely reliable in order to prevent potential danger to oneself or danger to other road users. A realization of such a fully automated driving is therefore associated with a high technical effort and correspondingly high costs. Even if the driver of a means of transport driving fully automatically is usually required to monitor all driving maneuvers of the fully automated control system, he or she is not forced by principle to check the plausibility of each individual control action by a confirmation action, i.e. that a possible misinterpretation of the current traffic situation by the fully automated control system may possibly not be intercepted by the driver.

It is therefore an object of the present invention to reduce and/or eliminate the above-mentioned disadvantages of the prior art.

SUMMARY

The solution to the above identified object is provided by the features of the independent claims. The subclaims comprise preferred further developments of the invention.

According to a first aspect, a method for an automated starting of a means of transport at a light-signal system is proposed, and in particular starting from the first line. In a first step of the inventive method, an image of the light-signal system is recorded by means of a first optical sensor of the means of transport. The first optical sensor, which may be a camera, is preferably arranged at a front part of the means of transport, so that the camera may detect typical positions of light-signal systems in a suitable way. The camera may be a component of an already existing driver assistance system of the means of transport, or a camera used exclusively for the inventive method. Since conventional light-signal systems may often be arranged at different positions in relation to a stop line of a driving lane, an arrangement of additional cameras on the means of transport with deviating positions and orientations may be advantageous to ensure an optimal detection of the respective light-signal system by at least one of the cameras.

The image of the light-signal system recorded by the camera may be transmitted, in particular in the form of digital or analogue signals representing the image, by cable or by means of a radio link from the camera to a controller of the means of transport. The controller may include an evaluation unit, which in turn may include a processor for processing the signals received from the camera.

Furthermore, a storage unit may be connected to the evaluation unit, in which, among other things, the signals received by the evaluation unit may be stored.

In particular, the light-signal system may be a traffic light which may represent typical signaling states in the form of a red phase, a yellow phase and a green phase by means of corresponding light signals. For the sake of a simplified description, it should be noted that the large number of variants existing worldwide with regard to the sequence and duration of individual traffic light phases will not be discussed in detail.

Instead, the method according to the invention is explained in detail using a typical example sequence of traffic light phases. The change of signaling states relevant to the method according to the invention refers to the change of a signaling state from a non-granted travel clearance (red phase) to a granted travel clearance (green phase) and/or announced travel clearance (yellow phase), whereby sequences deviating from the example sequence described here may be adapted to the inventive method in a suitable manner.

In a second step of the inventive method, a signaling state of the light-signal system is determined on the basis of the recorded image. The determination of the signaling state is preferably done by means of known algorithms for image analysis, which may be executed by the processor of the evaluation unit. If several cameras are used to detect the light-signal system, the evaluation unit may additionally perform a comparison of the images of the individual cameras in order to select the image with the most reliable and/or complete representation of the light-signal system for determining the signaling state. In this context, it may also be advantageous to evaluate the images of several cameras in parallel in order to be able to additionally check the plausibility of the result of the determination of the signaling state.

In a third step of the method according to the invention, an automated starting process of the means of transport is carried out in the case that a signaling state has been determined which preferentially announces a travel clearance (i.e. a yellow phase with a change from red to green). Alternatively, the automated starting process may also only be carried out when the signaling state represents the actual travel clearance (green phase). The latter may be particularly relevant if the signaling sequence of the light-signal system does not provide for a yellow phase when changing from red to green, depending on the country. However, even in connection with an existing yellow phase in the signaling sequence when changing from red to green, it may be desired or necessary that the starting process does not take place until the light-signal system actually provides a travel clearance. The automated starting process may preferably be performed by an already existing driver assistance system for longitudinal control of the means of transport, which may be an adaptive cruise control. The evaluation unit may, for example, be connected to the adaptive cruise control system via a bus system of the means of transport such as CAN, FlexRay, MOST or Ethernet in order to transmit a corresponding control signal to the same in response to the determined travel clearance by the light-signal system. Alternatively, the program logic executed on the evaluation unit may also be executed in the adaptive cruise control itself or in other existing control devices of the means of transport.

One advantage of the automated starting process is that the driver's attention is intuitively directed to the traffic situation by the starting movement after a travel clearance has been provided. In contrast to the known methods of attracting the driver's attention by means of optical and/or acoustic and/or haptic indications, the kinesthetic nature of the starting process results in a direct correlation between the indicating action and the continuation of the journey for the driver. The dynamics of the starting movement may be designed as an attention-getting moment according to the driver's attention, e.g. as a perceived jerk when leaving the standstill.

In a fourth step of the inventive method, a user action of a driver of the means of transport is determined for the plausibility check of the starting process. In concrete terms, this means that the inventive method, in contrast to fully automated driving, provides for a user action to ensure that the automated starting process is not carried out erroneously due to a possible misinterpretation of a driving clearance and thus leads to a potential danger to the driver's own safety or to a danger to other road users. Such a user action may be, for example, the actuation of a predefined control element and/or the accelerator or brake pedal and/or the execution of a user gesture within a predefined time after starting to drive. The plausibility check is carried out by the driver preferably carrying out his own assessment of the traffic situation at short intervals (e.g. 2-3 seconds) after the start of the starting process, independent of the assessment by the evaluation unit and/or any other driver assistance systems. In the event that the driver may not detect any traffic hazard from the starting process, he or she may, for example, perform a plausibility check of the starting process by actuating a predefined control element.

Such a pre-defined operating element could be, for example, a push button arranged at the steering wheel, which may be easily reached and operated by the driver without having to look away from the traffic ahead to execute the operation. In addition, numerous other positions of such a predefined operating element in the means of transport are conceivable, which are preferably easy to reach and operate for the driver.

As an alternative or in addition, the driver may also confirm during the automated starting process, for example, by pressing (briefly touching) the accelerator pedal, that the journey is to be continued by the driver assistance system. Alternatively or additionally, a predefined user gesture and/or other movement, such as a nodding of the head, may be performed by the driver during the automated starting process and determined by the evaluation unit. This may be achieved, for example, by using a second optical sensor in the form of an interior camera of the means of transport, which is positioned and aligned in such a way that it may reliably detect user gestures and/or further movements of the driver. The image signals generated by the interior camera may be analyzed and evaluated in the evaluation unit following transmission to the evaluation unit. A successful plausibility check determined in this way (e.g. by nodding the head) may lead to a continuation of the journey, analogous to an operating element operated by the driver. The same applies to a potential plausibility check of the starting process by the driver giving a voice command, which may be detected by a microphone of the means of transport and identified by a voice recognition system. A successful plausibility check determined in this way may then be transmitted by a suitable interface from the voice recognition system to the evaluation unit by means of a signal.

If the driver fails to perform a successful plausibility check during the starting process, the longitudinal control activated by the evaluation unit will preferably cause the means of transport to come to a standstill again automatically, so that no traffic hazard is caused by a non-plausible starting process.

In a further advantageous embodiment of the present invention, the execution of the automated starting process may be limited to a predefined distance in the event of an unsuccessful plausibility check. For example, the predefined distance may be set to a value of approximately 50 cm, but values deviating from this are also conceivable.

Preference is given to the following criteria when selecting a suitable value for the predefined distance: firstly, the value should be large enough to ensure that the driver's attention is drawn to the traffic ahead in conjunction with a predefined acceleration of the means of transport. On the other hand, the value should be kept as small as possible in order to be able to bring the means of transport to a standstill in time in the event of an unsuccessful plausibility check without endangering other road users or one's own means of transport by the non-plausible automated starting process.

In a further advantageous embodiment of the present invention, executing the automated starting process may be limited to a distance which is determined depending on the visibility of the light-signal system by the driver in the event of an unsuccessful plausibility check. For this purpose, further information may be made available to the inventive evaluation unit so that it is able to determine a suitable value for the distance travelled adapted to the respective situation. To ensure that the light-signal system is permanently visible to the driver during the starting process, the position and orientation of the driver's eyes in relation to the light-signal system, for example, may be detected and determined. A suitable means of detecting the position and orientation of the eyes may again be the interior camera mentioned above, which is preferably positioned in the means of transport in such away that it may always reliably detect the eyes of the driver, regardless of his or her size and seating position. For example, a suitable position may be above the driver in the front part of the headlining of the means of transport. Preferably, this camera is an interior camera of an attention assistance system already present in the means of transport, which is used, for example, to detect driver fatigue.

By correspondingly connecting the interior camera to the evaluation unit according to the invention, the image signals generated by the interior camera may be received and evaluated by the evaluation unit. Here again, well-known algorithms for image analysis may be used to determine information on the position and orientation of the driver's eyes. By also providing the evaluation unit with information on the nature of the body of the means of transport, the position and orientation of the interior camera in relation to the body and the position and orientation of the camera for detecting the light-signal system in relation to the body, the evaluation unit may determine a situation-dependent value for the distance travelled by the starting process based on this information, which enables the light-signal system to be permanently visible to the driver during the starting process.

In a further advantageous embodiment of the present invention it may be determined by the evaluation unit that an automated starting process is to be executed at a light-signal system in order to determine in dependence thereon a stopping and/or starting position of the means of transport such that it is located by a predefined value in front of a stop line of the light-signal system. For this purpose, the evaluation unit may use the methods described above to determine a maximum distance for an unsuccessful plausibility check of the starting process. This means that for the embodiment of the present invention described here, for example, the predefined distance (of about 50 cm) or the distance determined depending on the situation may be used depending on the visibility of the light-signal system. Alternatively, a maximum value from these two distance values may be used. In the course of an automated stopping process in front of a light-signal system, which is preferably carried out by the adaptive cruise control of the means of transport, the evaluation unit may transmit a corresponding signaling to the adaptive cruise control when approaching the light-signal system, so that the same stops the means of transport by the respective target value for the distance in front of the stop line of the light-signal system. In this way it may be ensured that the light-signal system remains visible to the driver for the entire distance of an unsuccessfully plausibilised starting process during the subsequent automated starting process, and/or that the light-signal system is not passed during the starting process. This also offers the advantage that a starting process that has not been successfully plausibilised does not lead to the light-signal system's stop line being crossed, which may cause a problem when starting during a yellow phase (e.g. due to a triggering traffic light flasher).

In a further advantageous embodiment of the present invention, the image taken by the first optical sensor, which comprises the signaling state of the light-signal system at the time of the automated starting process, may be shown in a display of the means of transport visible to the driver. This may be particularly advantageous if the driver is unable to see or may only see part of the light-signal system due to an unfavorable starting position of the means of transport in relation to the light-signal system. Furthermore, the embodiment described here may also be used advantageously, in particular if the driver is not looking at the light-signal system at the time a travel clearance is indicated by the light-signal system. This means that in the course of the subsequent automated starting process, the driver may not be able to see the light-signal system in time before it disappears from his or her field of vision due to the movement of the means of transport.

A display visible to the driver may, for example, be a display of an on-board computer system and/or instrument cluster and/or a HeadUp display present in the means of transport. A presentation of the recorded image on a HeadUp display of the means of transport also has the advantage that the driver may see the traffic situation in front of the means of transport and the display contents of the HeadUp display at a glance by orienting his or her gaze in the direction of travel. For this purpose, the inventive evaluation unit may be connected to one or more suitable displays of the means of transport, and/or to controllers which control these displays, by means of appropriate interfaces.

It should be noted that the image signals transmitted by the evaluation unit to the display, which represent the state of the light-signal system, are preferably transmitted and displayed in the form of real images. "Real" in this context means that this is not a symbolic representation of the signal state of the light-signal system, but that the image of the light-signal system recorded by the first optical sensor may be shown in a more or less unchanged form (e.g. as a "photorealistic representation") on the display or in a part of the display intended for the inventive method. In "more or less unchanged form" means in concrete terms that the image signals of the first optical sensor may in principle be displayed directly, but that these signals may be processed by suitable methods for adapting an image geometry with the aim of an improved recognition by the driver before they are output on the display. For example, the transmitted images may be subjected to a geometric transformation by the evaluation unit, for example to equalize a trapezoidal distortion of the image of the light-signal system (due to the recording angle by the first optical sensor in relation to the light-signal system). In addition, it may also be useful to limit the image section to the light signals of the light-signal system in order to improve the visibility of the light signals. It is also conceivable that instead of displaying a single image, a sequence of images may be shown on the display, for example to illustrate the change from one signaling state to the next.

In a further advantageous embodiment of the present invention, the driver may be informed of the starting process by an optical and/or acoustic and/or haptic indication in addition to the automated starting process. This may be achieved by connecting the evaluation unit to the corresponding controllers in the means of transport. An optical and/or acoustic indication may be realized, for example, by connecting the evaluation unit to an entertainment/infotainment system of the means of transport, since this usually controls a display visible to the driver and an audio system of the means of transport. A haptic indication may be realized, for example, by connecting the evaluation unit to a controller for controlling a steering wheel or a seat vibration.

The output of one of the above-mentioned additional indications may be triggered by the evaluation unit at the same time as the starting process is initiated by a signal transmission to the respective controllers. However, the additional indication may also be triggered delayed by a predefined time or distance at the start of the starting process, in order to give the driver the opportunity for a positive plausibility check of the starting process (for example, by pressing a steering wheel button). The additional indication may be omitted after a plausibility check has been executed, since the driver's attention to the traffic situation has already been confirmed by his or her user action. The output of the additional indication may also be executed depending on a determined viewing direction of the driver. If, for example, the evaluation unit detects a view of the driver directed towards the rear seats at the time of a travel clearance by the light-signal system by means of a corresponding recording taken by the interior camera, it may be useful to output the additional indication, since the driver's attention is not focused on the traffic situation at this time. Conversely, if the driver is already looking at the traffic ahead at the time of starting, this may lead to an omission of the output of an additional indication. In addition, a driver's gaze directed at the traffic situation at the time of the starting process may also be evaluated as an (implicit) plausibility check of starting, which means that the driver no longer has to perform any further plausibility checks during the starting process. In this way, the method according to the invention may improve both comfort and also safety in the course of automated starting.

According to a second aspect, an inventive device is proposed for an automated starting of a means of transport at a light-signal system. The device comprises an evaluation unit which comprises, for example, a processor which is configured to carry out the method steps according to the invention. The evaluation unit is configured to receive an image of the light-signal system in connection with a data input by means of a first optical sensor of the means of transport, which may be a camera, and to determine a signaling state of the light-signal system on the basis of the recorded image. Further, the evaluation unit in connection with the data output is configured to execute an automated starting process of the means of transport in response to a signaling state representing and/or announcing a travel clearance. In connection with the data input, the evaluation unit is additionally capable to determine a user action of a driver of the means of transport for plausibility checking of the starting process. Further, the evaluation unit in connection with the data output is configured to automatically continue or terminate the starting process depending on a result of the plausibility check.

According to a third aspect of the present invention, a means of transport is proposed which comprises a device according to the second mentioned inventive aspect. The features, combinations of features and the advantages resulting from the same correspond to those discussed in connection with the first and second mentioned aspects and reference is made to the above explanations in order to avoid repetition.

BRIEF DESCRIPTION OF THE FIGURES

Further details, features and advantages of the invention result from the following description and figures, in which.

DETAILED DESCRIPTION

Figure 1:
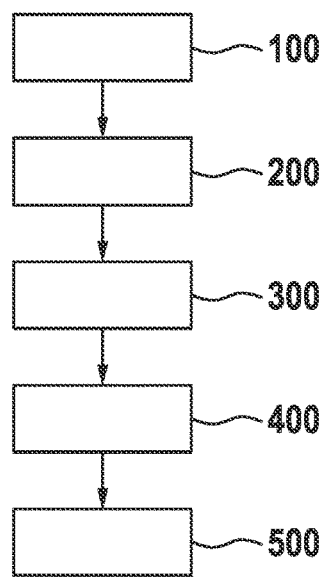
FIG. 1 is a flow chart illustrating steps of an embodiment of an inventive method.

FIG. 1 shows steps of an embodiment of an inventive method for an automated starting of a means of transport 80 at a traffic light 70. In the first step 100 an image of a traffic light 70 is recorded by a camera 30 of the means of transport 80, which is aligned in the direction of travel. The camera 30 is arranged at the means of transport 80 in such a way that an optimum view of the light signals of the traffic light 70 is always ensured, regardless of a respective stop position 74 of the means of transport 80 in front of the traffic light 70 and regardless of a respective positioning of the traffic light 70 in relation to the road. The camera 30 is connected by means of a digital interface to an evaluation unit 10, which is able to receive and evaluate the digital image signals generated by the camera 30. For this purpose, the received image signals in the form of digital data are first stored in a storage unit 20 connected to the evaluation unit 10. In step 200, the evaluation unit 10 determines a signaling state of the traffic light 70 by analyzing the digital data of the image signals stored in the storage unit 20. The evaluation unit 10 manages the respective currently determined signaling state of the traffic light 70 in a variable in the storage unit 20. In step 300, in response to a change in the signaling state of the traffic light 70 from a red-light signal to a yellow light signal, an automated starting process is initiated by the evaluation unit 10 by transmitting a starting signaling to a control device for longitudinal control of the means of transport, which is an adaptive cruise control 50. In step 400, a user action of a driver of the means of transport 80 is determined by the evaluation unit 10 for the plausibility check of the starting process. In this embodiment, a head movement of the driver in the form of a head nod serves as a plausibility check, i.e. as a confirmation of the automated starting process. This head movement is detected by means of an interior camera 40 of the means of transport 80 and transmitted by means of digital image signals from the interior camera 40 to the evaluation unit 10. The evaluation unit 10 analyses the received image signals by means of suitable image analysis algorithms in order to classify the user action performed by the driver. Based on the detected head nodding during the starting process, the evaluation unit 10 signals the adaptive cruise control 50 in step 500 that the automatically recorded trip may be continued by the driver due to the successful plausibility check.

Figure 2:
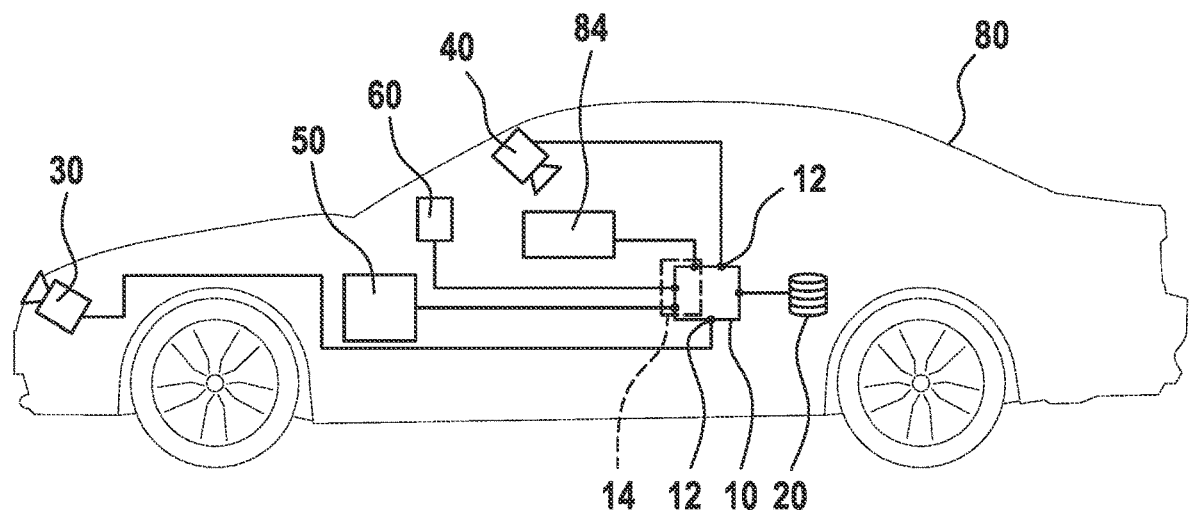
FIG. 2 is schematic overview of components of an inventive device in connection with a means of transport.

FIG. 2 shows a schematic overview of components of an inventive device in connection with a means of transport 80. The device comprises an evaluation unit 10, which in turn has a data input 12 and a data output 14. By means of the data input 12, the evaluation unit is able to receive image signals from a camera 30 oriented in the direction of a traffic light 70, which is positioned in a front area of the means of transport 80 in the direction of travel. Furthermore, the evaluation unit 10 is able to receive image signals of an interior camera 40 of the means of transport 80, which is positioned in a front area of the headlining, above a driver of the means of transport, by means of the data input 12. The cameras 30, 40 transmit the recorded image information in the form of digital image signals to the evaluation unit 10. Furthermore, a storage unit 20 is connected to the evaluation unit 10, in which the evaluation unit 10 stores the received digital image signals and state variables and data of the evaluation unit 10. By means of the data output 14 the evaluation unit 10 is able to control an adaptive cruise control 50 to perform a starting process. In addition, a HeadUp display is connected to the evaluation unit 10 via the data output 14 for displaying an image of the traffic light 70 at the time of a change of the signaling state of the traffic light 70 from red to yellow. In addition, the evaluation unit 10 is connected via the data output 14 to an infotainment system 84 of the means of transport 80 in order to output an acoustic indication to the infotainment system 84 in the means of transport 80 via a corresponding signaling in order to draw the driver's attention to the traffic situation in front of him or her.

Figure 3:
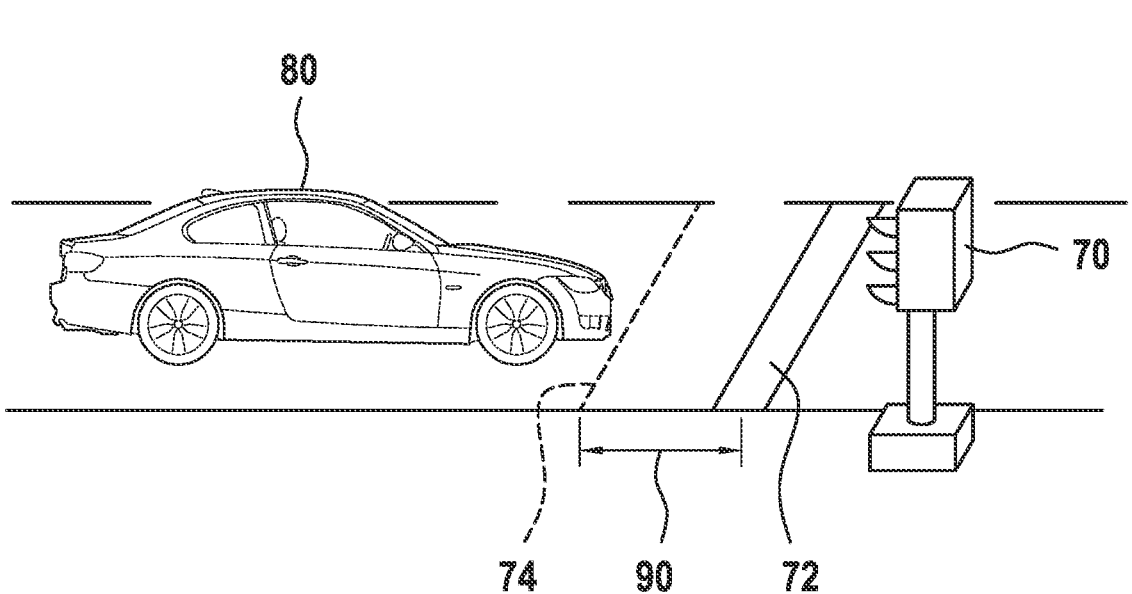
FIG. 3 is an example of an inventive starting situation at a light-signal system.

FIG. 3 shows an example of an inventive starting situation at a traffic light 70. When it reaches the traffic light 70, which is switched to red, the means of transport 80 has assumed a stop position 74 at a predefined spacing from the traffic light 70 and/or its stop line on the road. The predefined spacing corresponds to a maximum distance 90 for an automated starting process, which is ensured by an inventive evaluation unit 10. The pre-defined distance ensures that when the automated starting process of the means of transport 80 is carried out, when the signal status of the traffic light changes from red to yellow, the traffic light remains visible to a driver of the means of transport 80 during the entire starting process. This makes it possible to check the plausibility of the automated starting process by evaluating the signaling state of the traffic light 70 by the driver.

LIST OF REFERENCE NUMERALS

10 Evaluation unit
12 Data input
14 Data output
20 Storage unit
30 Camera
40 Indoor camera
50 Adaptive cruise control
60 HeadUp display
70 Traffic lights
72 Stop line
74 Stop position
80 Means of transport
84 On-board computer system
90 Distance of the starting process
100-500 Method steps

The invention claimed is:

1. A method of an automated starting of a means of transport at a light-signal system, comprising:
   recording an image of the light-signal system by means of a first optical sensor of the means of transport,
   determining a signaling state of the light-signal system by means of the recorded image,
   executing an automated starting process of the means of transport in response to a signaling state representing and/or announcing a travel clearance,
   determining a user action of a driver of the means of transport for plausibility checking of the starting process,
   wherein executing the automated starting process is limited to a distance during the plausibility check, and, depending on a result of the plausibility check, automatically continuing or terminating the starting process.

2. The method according to claim 1, wherein the distance is a predefined distance in the event of an unsuccessful plausibility check.

3. The method of claim 2, wherein the predefined distance is in the range of 30 cm to 100 cm.

4. The method according to claim 1, wherein the distance is automatically determined depending on the visibility of the light-signal system by the driver in the event of an unsuccessful plausibility check.

5. The method of claim 4, wherein the automated starting process is further limited to a predefined maximum distance.

6. The method of claim 5, wherein the predefined maximum distance is in the range of 30 cm to 100 cm.

7. The method according to claim 1, further comprising determining that an automated starting process is to be executed at a light-signal system in order to determine in dependence thereon a stopping and/or starting position of the means of transport such that it is located in front of a stop line of the light-signal system by a predefined value.

8. The method according to claim 1, wherein the automated starting at the end of a red phase is carried out at a signal change of the light-signal system from red to green.

9. The method according to claim 1, wherein the user action for plausibility checking of the starting process comprises an actuation of an operating element and/or an actuation of an accelerator or brake pedal and/or a user gesture and/or a voice command.

10. The method according to claim 1, further comprising determining the direction of view of the driver by means of a second optical sensor of the means of transport, wherein an alignment of the direction of view in the direction of driving with the traffic situation is categorized as a successful plausibility check of the starting process.

11. The method according to claim 1, wherein the image comprising the signaling state of the light-signal system at the time of the automated starting process is shown in a display of the means of transport visible to the driver.

12. The method according to claim 1, wherein the driver is informed of the starting process by an optical and/or acoustic and/or haptic indication in addition to the automated starting process.

13. A device for an automated starting of a means of transport at a light-signal system, comprising:
   a data input,
   an evaluation unit, and
   a data output, wherein
   the evaluation unit is configured to
      in connection with the data input, receive an image of the light-signal system by means of a first optical sensor of the means of transport,
      determine a signaling state of the light-signal system using the recorded image,
      in connection with the data output, execute an automated starting process of the means of transport in response to a signaling state representing and/or announcing a travel clearance,
      in connection with the data input, determine a user action of a driver of the means of transport for plausibility checking of the starting process,
         wherein executing the automated starting process is limited to a distance during the plausibility check, and
      in connection with the data output, automatically continue or terminate the starting process depending on a result of the plausibility check.

14. A means of transport comprising a device according to claim 13.

15. The device of claim 13, wherein the distance is a predefined distance.

16. The device of claim 15 wherein the predefined distance is in the range of 30 cm to 100 cm.

17. The device of claim 13, wherein the distance is automatically determined depending on the visibility of the light-signal system by the driver.

18. The method of claim 17, wherein the predefined maximum distance is in the range of 30 cm to 100 cm.

* * * * *